US012606717B2

(12) United States Patent
Yamada et al.

(10) Patent No.: US 12,606,717 B2
(45) Date of Patent: Apr. 21, 2026

(54) AZO PIGMENT, INK, PAINT, COLORANT FOR PLASTICS, COLORED MOLDED ARTICLE, COLORANT FOR STATIONERY AND WRITING MATERIALS, PRINTING AGENT, TONER, DISPERSION AND RESIST FOR COLOR FILTERS, AND COSMETIC MATERIAL

(71) Applicant: DIC Corporation, Tokyo (JP)

(72) Inventors: Shogo Yamada, Kamisu (JP); Takuya Yoshida, Kamisu (JP); Akira Kimura, Kamisu (JP)

(73) Assignee: DIC CORPORATION, Tokyo (JP)

( * ) Notice: Subject to any disclaimer, the term of this patent is extended or adjusted under 35 U.S.C. 154(b) by 328 days.

(21) Appl. No.: 18/274,904

(22) PCT Filed: Dec. 9, 2021

(86) PCT No.: PCT/JP2021/045264
§ 371 (c)(1),
(2) Date: Jul. 28, 2023

(87) PCT Pub. No.: WO2022/176337
PCT Pub. Date: Aug. 25, 2022

(65) Prior Publication Data
US 2024/0084155 A1    Mar. 14, 2024

(30) Foreign Application Priority Data

Feb. 18, 2021    (JP) ................................. 2021-024126

(51) Int. Cl.
| | |
|---|---|
| *C09D 17/00* | (2006.01) |
| *C09B 67/08* | (2006.01) |
| *C09D 11/037* | (2014.01) |

(52) U.S. Cl.
CPC ........ *C09D 17/003* (2013.01); *C09B 67/0007* (2013.01); *C09D 11/037* (2013.01)

(58) Field of Classification Search
CPC .................................................. C09D 17/003
See application file for complete search history.

(56) References Cited

U.S. PATENT DOCUMENTS

| | | | |
|---|---|---|---|
| 2002/0075369 A1 | 6/2002 | Ota et al. | |
| 2003/0116017 A1* | 6/2003 | Pozarnsky | B01D 47/00 95/149 |
| 2012/0107579 A1* | 5/2012 | Grinwald | C09D 11/326 524/522 |

FOREIGN PATENT DOCUMENTS

| | | |
|---|---|---|
| JP | H06-192587 A | 7/1994 |
| JP | 11-279428 A | 10/1999 |
| JP | 3236804 B2 | 12/2001 |
| JP | 2002-20673 A | 1/2002 |
| JP | 2003-96349 A | 4/2003 |
| JP | 2016-41785 A | 3/2016 |
| JP | 2020-084026 A | 6/2020 |

OTHER PUBLICATIONS

"Formulation of a graft polymer-containing aqueous yellow ceramic ink for digital ink-jet printing," Lee et al., RCE Avd. 2020, 10, 2428-2436. (Year: 2020).*
International Search Report dated Mar. 8, 2022, issued in counterpart International Application No. PCT/JP2021/045264 (2 pages).
Szadkowski, B. et al., Aluminum-Magnesium Hydroxycarbonate/ Azo Dye Hybrids as Novel Multifunctional Colorants for Elastomer Composites, Polymers, vol. 11, No. 1, Dec. 29, 2018, p. 1-19. (19 pages); cited in Extended European Search Report dated Dec. 18, 2024.
Akaho, A. et al., Synthesis and Evaluation of Iron (III)-Red Onion Skin Extract Azo Complexes as Pigments for Surface Coatings in Oilfield Environment, Chemical Science International Journal, vol. 25, No. 3, Jan. 5, 2019, p. 1-9. (9 pages); cited in Extended European Search Report dated Dec. 18, 2024.

* cited by examiner

*Primary Examiner* — Ian A Rummel
(74) *Attorney, Agent, or Firm* — WHDA, LLP

(57)    ABSTRACT

An object that is to be achieved by the present invention is to provide an azo pigment having excellent transparency, suitable dispersibility, and a low viscosity, an ink, and the like. An azo pigment according to the present invention has a zeta potential of −80 to −30 mV in isopropanol (IPA). The content of a metal element in the azo pigment is preferably 0.05 to 2.00 parts by mass relative to 100 parts by mass of the azo pigment. The metal element is preferably an iron element. The ratio (Fe/C) of the concentration Fe (atomic %) of an iron element in the surfaces of particles of the azo pigment to the concentration C (atomic %) of a carbon element in the surfaces of the particles of the azo pigment which are determined by X-ray photoelectron spectroscopy is preferably 0.20 or less.

6 Claims, No Drawings

AZO PIGMENT, INK, PAINT, COLORANT FOR PLASTICS, COLORED MOLDED ARTICLE, COLORANT FOR STATIONERY AND WRITING MATERIALS, PRINTING AGENT, TONER, DISPERSION AND RESIST FOR COLOR FILTERS, AND COSMETIC MATERIAL

TECHNICAL FIELD

The present invention relates to an azo pigment and an ink, a paint, a colorant for plastics, a colored molded article, a colorant for stationery and writing materials, a printing agent, a toner, a dispersion and a resist for color filters, and a cosmetic material that include the azo pigment.

BACKGROUND ART

Azo pigments have been used primarily as an ink, a paint, and a toner and for coloration of rubbers and plastics, coloration of raw-material solutions of synthetic fibers, pigment printing, and coloration of sundries. Among these, application of azo pigments to printing as an ink or the like is important. Printing is performed by preparing a printing plate, applying a printing ink onto the surface of the plate, and transferring the ink to a paper sheet, a film, a cloth, or the like. Examples of the printing plate include a litho plate, an intaglio plate, a letterpress plate, and a stencil printing plate. Printing methods such as offset printing, gravure printing, and flexographic printing are used depending on the shape of the plate. In gravure printing in which an intaglio plate is used, when multicolored printing is performed, printing is commonly performed in order of black, cyan, magenta, and yellow. An example of the printing method other than the above printing methods is ink-jet printing, in which printing is performed by impinging a jet of an ink directly on a paper sheet. Since an image corresponding to each color is formed on another image corresponding to the previous color so as to overlap on the other image, the inks are required to have certain transparency for producing printed matter having a clear image. The transparency of an ink varies by the properties of the pigment used as a colorant.

A known method for improving the transparency of an ink is, for example, as for azo pigments, to pulverize a condensed disazo pigment by solvent salt milling as described in PTL 1. Zeta potential has been used in various fields as a parameter for determining the stability of dispersion of colloidal particles, such as pigment particles, and the degree of aggregation of the colloidal particles. For example, a method in which, as described in PTL 2, the zeta potential of pigment particles included in an aqueous solvent is adjusted to a specific value in order to enhance the transparency of images formed using an inkjet ink is known.

CITATION LIST

Patent Literature

PTL 1: Japanese Unexamined Patent Application Publication No. H11-279428
PTL 2: Japanese Unexamined Patent Application Publication No. 2003-96349

SUMMARY OF INVENTION

Technical Problem

In PTL 1, a disazo pigment is kneaded with a water-soluble inorganic salt and a water-soluble solvent in order to perform pulverization. This reduces the scattering of light and enhances the transparency of a coating film. However, the pulverization increases the surface area of the pigment particles, and the intermolecular attractive force due to the van der Waals force is increased accordingly. This results in degradation of dispersibility and disadvantageously increases the viscosity of an ink produced using the pigment.

In PTL 2, zeta potential is measured after an inkjet ink has been prepared using a pigment and the inkjet ink has been diluted. In PTL 2, it is described that zeta potential is imparted by changing the type and amount of the surfactant used for dispersing the pigment and by the addition of an additive having a certain electric charge. However, it is difficult to adjust the zeta potential to an intended value, because the additive may dissociate from the pigment particles depending on the medium of the ink. In PTL 2, since a dispersion network is constituted by a pigment, a resin, a solvent, and an additive after dispersion has been performed, a resin and an additive are present in the vicinity of pigment particles. Thus, when the measurement is conducted using the above method, the zeta potential of pigment particles covered with the resin and the additive is measured; it cannot be said that the zeta potential of only the pigment particles is measured. That is, it cannot be said that the zeta potential measured in PTL 2 indicates the state of aggregation or dispersion of pigment particles. Therefore, it cannot be said that an ink having excellent transparency and a low viscosity is produced.

Accordingly, an object of the present invention is to provide an azo pigment having excellent transparency, suitable dispersibility, and a low viscosity, an ink, and the like.

Solution to Problem

Solvents having various polarities, such as water and hydrophobic organic solvents, have been used for not only the inkjet ink described in PTL 2 above but also common inks. Accordingly, the inventors of the present invention conducted studies and consequently used isopropanol (IPA) having a hydrophilic group and a hydrophobic group as a solvent for the measurement of zeta potential. It was considered that, since IPA is miscible with both hydrophilic solvents, such as water, and hydrophobic solvents, a zeta potential measured in IPA is a universal index that can be used for any inks regardless of type of solvent. An azo pigment is a pigment that has an azo group ($-N=N-$) serving as a chromophore. Since an azo group has a strong chromogenic effect, the hue of an azo pigment can be changed within a wide range, such as yellow, orange, red, purple, blue, and brown using an auxochrome. Because of the above-described advantages, half or more of the organic pigments registered in the Colour Index are azo pigments. Therefore, it is quite important to improve the transparency and dispersibility of azo pigments.

As described above, the inventors of the present invention focused attention on the zeta potential of an azo pigment in an IPA solvent and conducted further studies. Consequently, the inventors of the present invention found that an azo pigment having excellent transparency, suitable dispersibility, and a low viscosity can be produced when the above zeta potential is adjusted to fall within a specific range and made the present invention.

In PTL 2, the zeta potential of a magenta pigment ink is measured after the magenta pigment ink has been diluted 1000-fold. Although the medium used for dilution is not clearly described, it is considered that pure water is used in the measurement of zeta potential because a magenta pigment dispersion is diluted with pure water in the preparation of the magenta pigment ink. Thus, in PTL 2, water is used as a solvent for the measurement of zeta potential. Zeta potential in IPA cannot be easily conceived of from PTL 2.

Details of the mechanisms of the present invention are presumably as follows.

Although pigment particles are nano-level particles (primary particles), the primary particles aggregate with one another due to the van der Waals forces acting between the particles to form secondary particles. In the preparation of an ink that includes a pigment that serves as a coloring component, the secondary particles of the pigment are crushed into primary particles in a dispersion step. However, without any treatment, the primary particles disadvantageously re-aggregate with one another due to the attractive forces between the particles. Since the aggregates are coarse, they have a strong action of scattering light and become the cause of degrading transparency. Furthermore, the formation of the aggregates results in degradation of the mobility of the pigment particles and causes solvent molecules to be fixed to gaps between the particles. This increases viscosity. In order to address the above issues, a pigment that has a specific zeta potential in IPA is used. This causes the repulsion between the electric double layers of the pigment particles, which reduces the likelihood of the pigment particles approaching and aggregating with one another. As a result, suitable dispersibility and suitable transparency can be achieved. For imparting a zeta potential having a large absolute value to pigment particles, it is necessary to make a substance having an electric charge be present on the surfaces of the particles by any method. One of the simplest methods is to treat an ionic substance, such as a metal salt. However, when a metal salt is simply mixed with a pigment, the salt discharges from the pigment particles easily. Accordingly, a metal is oxidized with an oxidizing agent in the presence of a pigment and a metal salt in order to treat the surfaces of the pigment particles with the metal. There are various choices of metals and oxidizing agents. Selecting inexpensive compounds results in economic advantageous. Since the reaction between a metal and an oxidizing agent is complex, it is difficult to identify which compound the metal has been changed into. For example, when the metal is an iron, it is considered that the metal is changed to iron oxide or iron oxyhydroxide. As described above, a specific zeta potential is imparted to a pigment in IPA by making a metal be present on the surfaces of the pigment particles. In the present invention, it is important that a metal be present on the surfaces of pigment particles. It is not sufficient that a metal element be only included in the structure of the pigment. High transparency and high dispersibility cannot be achieved unless the metal is exposed at the surfaces of the pigment particles.

Specifically, the present invention relates to

<<Item 1. An azo pigment having a zeta potential of −80 to −30 my in isopropanol (IPA).

Item 2. The azo pigment according to Item 1, wherein a content of a metal element is 0.05 to 2.00 parts by mass relative to 100 parts by mass of the azo pigment.

Item 3. The azo pigment according to Item 2, wherein the metal element is an iron element.

Item 4. The azo pigment according to Item 3, wherein a ratio (Fe/C) of a concentration Fe (atomic %) of an iron element in surfaces of particles of the azo pigment to a concentration C (atomic %) of a carbon element in the surfaces of the particles of the azo pigment, the concentrations Fe and C being determined by X-ray photoelectron spectroscopy, is 0.20 or less.

Item 5. An ink including the azo pigment according to any one of Items 1 to 4.

Item 6. A paint, a colorant for plastics, a colored molded article, a colorant for stationery and writing materials, a printing agent, a toner, a dispersion and a resist for color filters, and a cosmetic material including the azo pigment according to any one of Items 1 to 4>>.

Advantageous Effects of Invention

The azo pigment according to the present invention has excellent transparency, suitable dispersibility, and a low viscosity. Therefore, the azo pigment according to the present invention is suitable for inks (in particular, a printing ink and an inkjet ink). The azo pigment according to the present invention can be used for various applications other than inks, such as paints, colorants for plastics, colorants for stationery and writing materials, printing agents, toners, dispersion and resists for color filters, and cosmetic materials.

DESCRIPTION OF EMBODIMENTS

Details of the present invention are described below.
[Azo Pigment]

The azo pigment according to the present invention has a zeta potential of −80 to −30 mV in isopropanol (IPA). The above zeta potential is preferably −70 to −35 mV and is more preferably −60 to −40 mV. When the zeta potential of the azo pigment in IPA falls within the above range, the azo pigment has excellent transparency, suitable dispersibility, and a low viscosity. The zeta potential of the azo pigment according to the present invention in water is, for example, −50 to 50 mV, is preferably −25 to 25 mV, and is more preferably −10 to 10 mV. Zeta potential can be measured by electrophoretic light scattering using a zeta potential-particle size-molecular weight measuring system.

The azo pigment according to the present invention preferably includes a metal element (metal). The form of the metal element (metal) is not limited to a metal simple substance and may be a metal compound, such as an oxide or a hydroxide. In the present invention, it is considered that the metal element (metal) is present on the surfaces of particles of the azo pigment. The metal element (metal) cannot be removed from the pigment only by simply washing with water or the like. Thus, the metal element (metal) interacts with primary particles of the pigment and affects the physical properties of the azo pigment. The metal element (metal) also affects the physical properties of an ink produced using the azo pigment.

The content of the metal element is, for example, 0.05 to 2.00 parts by mass, is preferably 0.10 to 1.80 parts by mass, and is more preferably 0.30 to 1.50 parts by mass relative to 100 parts by mass of the azo pigment. The metal element content is calculated in terms of simple substance of the metal element even when the metal element is in the form of a metal compound, such as an oxide or a hydroxide. When the above metal element content falls within the above range, the zeta potential is readily adjusted to fall within the above range. The metal element content can be measured by, for example, analyzing the pigment by X-ray fluorescence spectroscopy or ICP atomic emission spectroscopy-mass spectrometry.

Examples of the metal element (metal) include iron, copper, silver, nickel, zinc, chromium, titanium, cobalt, vanadium, manganese, gallium, zirconium, niobium, molybdenum, technetium, ruthenium, rhodium, palladium, cadmium, indium, and tin elements. Among the above metal elements (metals), an iron element (iron) is preferable. The iron element may be any substance that includes Fe as an element and may be in the form of an iron compound, such as iron oxide or iron hydroxide. Thus, the azo pigment according to the present invention preferably includes an iron element in an amount that falls within the above range.

In the case where the azo pigment according to the present invention includes an iron element (iron), the ratio (Fe/C) of the concentration Fe (atomic %) of an iron element in the surfaces of particles of the azo pigment to the concentration C (atomic %) of a carbon element in the surfaces of particles of the azo pigment which are measured by X-ray photoelectron spectroscopy is preferably 0.20 or less (e.g., 0.0001 to 0.20). The above Fe/C ratio is more preferably 0.15 or less and is further preferably 0.10 or less. When the Fe/C ratio falls within the above range, the zeta potential is readily adjusted to fall within the above range. The Fe/C ratio can be measured by X-ray photoelectron spectroscopy or the like.

The azo pigment may be any organic pigment that has an azo group (—N=N—) in the molecule. The azo pigment may be any of a soluble azo lake pigment, an insoluble azo pigment, and a condensed azo pigment. Examples of the azo pigment include C.I. Pigment Red 10, C.I. Pigment Red 11, C.I. Pigment Red 112, C.I. Pigment Red 114, C.I. Pigment Red 119, C.I. Pigment Red 12, C.I. Pigment Red 136, C.I. Pigment Red 14, C.I. Pigment Red 144, C.I. Pigment Red 146, C.I. Pigment Red 147, C.I. Pigment Red 15, C.I. Pigment Red 150, C.I. Pigment Red 16, C.I. Pigment Red 164, C.I. Pigment Red 166, C.I. Pigment Red 17, C.I. Pigment Red 170, C.I. Pigment Red 171, C.I. Pigment Red 175, C.I. Pigment Red 176, C.I. Pigment Red 18, C.I. Pigment Red 183, C.I. Pigment Red 184, C.I. Pigment Red 185, C.I. Pigment Red 187, C.I. Pigment Red 188, C.I. Pigment Red 193, C.I. Pigment Red 2, C.I. Pigment Red 200, C.I. Pigment Red 208, C.I. Pigment Red 21, C.I. Pigment Red 210, C.I. Pigment Red 211, C.I. Pigment Red 213, C.I. Pigment Red 214, C.I. Pigment Red 22, C.I. Pigment Red 220, C.I. Pigment Red 221, C.I. Pigment Red 23, C.I. Pigment Red 237, C.I. Pigment Red 238, C.I. Pigment Red 239, C.I. Pigment Red 242, C.I. Pigment Red 243, C.I. Pigment Red 245, C.I. Pigment Red 247, C.I. Pigment Red 253, C.I. Pigment Red 256, C.I. Pigment Red 258, C.I. Pigment Red 266, C.I. Pigment Red 268, C.I. Pigment Red 269, C.I. Pigment Red 3, C.I. Pigment Red 31, C.I. Pigment Red 32, C.I. Pigment Red 38, C.I. Pigment Red 4, C.I. Pigment Red 41, C.I. Pigment Red 48, C.I. Pigment Red 48:1, C.I. Pigment Red 48:2, C.I. Pigment Red 48:3, C.I. Pigment Red 48:4, C.I. Pigment Red 49, C.I. Pigment Red 49:1, C.I. Pigment Red 49:2, C.I. Pigment Red 5, C.I. Pigment Red 50:1, C.I. Pigment Red 52:1, C.I. Pigment Red 52:2, C.I. Pigment Red 53:1, C.I. Pigment Red 54, C.I. Pigment Red 57:1, C.I. Pigment Red 58, C.I. Pigment Red 58:4, C.I. Pigment Red 6, C.I. Pigment Red 60, C.I. Pigment Red 60:1, C.I. Pigment Red 63, C.I. Pigment Red 63:1, C.I. Pigment Red 63:2, C.I. Pigment Red 64:1, C.I. Pigment Red 68, C.I. Pigment Red 7, C.I. Pigment Red 8, C.I. Pigment Red 9, C.I. Pigment Red 95, C.I. Pigment Yellow 1, C.I. Pigment Yellow 10, C.I. Pigment Yellow 100, C.I. Pigment Yellow 104, C.I. Pigment Yellow 105, C.I. Pigment Yellow 106, C.I. Pigment Yellow 111, C.I. Pigment Yellow 113, C.I. Pigment Yellow 114, C.I. Pigment Yellow 116, C.I. Pigment Yellow 12, C.I. Pigment Yellow 120, C.I. Pigment Yellow 124, C.I. Pigment Yellow 126, C.I. Pigment Yellow 127, C.I. Pigment Yellow 128, C.I. Pigment Yellow 13, C.I. Pigment Yellow 130, C.I. Pigment Yellow 133, C.I. Pigment Yellow 14, C.I. Pigment Yellow 15, C.I. Pigment Yellow 151, C.I. Pigment Yellow 152, C.I. Pigment Yellow 154, C.I. Pigment Yellow 155, C.I. Pigment Yellow 16, C.I. Pigment Yellow 165, C.I. Pigment Yellow 166, C.I. Pigment Yellow 167, C.I. Pigment Yellow 168, C.I. Pigment Yellow 169, C.I. Pigment Yellow 17, C.I. Pigment Yellow 170, C.I. Pigment Yellow 172, C.I. Pigment Yellow 174, C.I. Pigment Yellow 175, C.I. Pigment Yellow 176, C.I. Pigment Yellow 180, C.I. Pigment Yellow 181, C.I. Pigment Yellow 183, C.I. Pigment Yellow 191, C.I. Pigment Yellow 191:1, C.I. Pigment Yellow 194, C.I. Pigment Yellow 2, C.I. Pigment Yellow 205, C.I. Pigment Yellow 206, C.I. Pigment Yellow 209, C.I. Pigment Yellow 212, C.I. Pigment Yellow 214, C.I. Pigment Yellow 219, C.I. Pigment Yellow 3, C.I. Pigment Yellow 4, C.I. Pigment Yellow 49, C.I. Pigment Yellow 5, C.I. Pigment Yellow 55, C.I. Pigment Yellow 6, C.I. Pigment Yellow 60, C.I. Pigment Yellow 61, C.I. Pigment Yellow 62, C.I. Pigment Yellow 63, C.I. Pigment Yellow 65, C.I. Pigment Yellow 7, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 87, C.I. Pigment Yellow 9, C.I. Pigment Yellow 93, C.I. Pigment Yellow 94, C.I. Pigment Yellow 95, C.I. Pigment Yellow 97, C.I. Pigment Yellow 98, C.I. Pigment Orange 1, C.I. Pigment Orange 13, C.I. Pigment Orange 15, C.I. Pigment Orange 16, C.I. Pigment Orange 17, C.I. Pigment Orange 17:1, C.I. Pigment Orange 19, C.I. Pigment Orange 2, C.I. Pigment Orange 22, C.I. Pigment Orange 24, C.I. Pigment Orange 3, C.I. Pigment Orange 34, C.I. Pigment orange 36, C.I. Pigment Orange 38, C.I. Pigment orange 4, C.I. Pigment Orange 46, C.I. Pigment Orange 5, C.I. Pigment Orange 60, C.I. Pigment Orange 62, C.I. Pigment Orange 64, C.I. Pigment Orange 72, C.I. Pigment Orange 74, C.I. Pigment Brown 25, C.I. Pigment Brown 32, C.I. Pigment Brown 5, C.I. Pigment Blue 25, C.I. Pigment Blue 26, C.I. Pigment Violet 13, C.I. Pigment Violet 17, C.I. Pigment Violet 32, and C.I. Pigment Violet 50. The above azo pigments may be used alone or in combination of two or more.

Among the above azo pigments, C.I. Pigment Red 57:1 (PR 57:1), C.I. Pigment Red 146 (PR 146), C.I. Pigment Yellow 13 (PY 13), C.I. Pigment Yellow 55 (PY 55), C.I. Pigment Yellow 83 (PY 83), C.I. Pigment Yellow 180 (PY 180), and C.I. Pigment Range 13 (PO 13) are preferable.

The size of primary particles of the azo pigment is, for example, 0.01 to 1.0 μm and is preferably 0.1 to 0.6 μm. The specific surface area of the azo pigment is, for example, 10 to 150 m$^2$/g and is preferably 20 to 100 m$^2$/g. When the above primary particle size and the above specific surface area fall within the above ranges, the azo pigment has an excellent coloring power and excellent dispersibility.

The azo pigment according to the present invention may include a pigment derivative, such as a sulfonic acid pigment derivative, an amino group-containing pigment derivative, or a phthalimidomethyl group-containing pigment derivative; a high-molecular-weight compound, such as a dispersant; a surfactant; a rosin; and the like. The azo pigment according to the present invention may include an inorganic pigment. Examples of the inorganic pigment include calcium carbonate, magnesium carbonate, precipitated barium sulfate, kaolin, clay, alumina white, and white carbon.

[Method for Producing Azo Pigment]

The azo pigment according to the present invention is produced by, for example, 1) synthesis of an azo pigment and 2) surface treatment of the synthesized pigment. In 1) the synthesis of an azo pigment, an azo pigment can be synthesized by coupling a diazo component composed of a diazonium salt of aromatic amine with a coupler component composed of an aromatic compound other than the aromatic amine constituting the diazonium salt. The diazonium salt of aromatic amine, which serves as a diazo component, can be produced by making aromatic amine acidic with hydrochloric acid and adding an aqueous sodium nitrite solution to the aromatic amine. The coupling of the diazo component with the coupler component is performed under an alkaline condition using sodium hydroxide or the like. In the case where the azo compound produced by coupling is a soluble azo (dye), the soluble azo may be made insoluble by the addition of an aqueous solution of a salt of a metal, such as calcium or barium, to form a metal-lake azo pigment. In 1) the synthesis of an azo pigment, a commercial azo pigment may be directly used instead of synthesizing an azo pigment by the above-described coupling reaction.

Subsequently, 2) the surface treatment of the synthesized pigment is performed by adding the azo pigment prepared in 1) the synthesis of an azo pigment to a solvent, stirring the resulting mixture to prepare a pigment slurry, adding a metal element and an oxidizing agent to the pigment slurry, and stirring the resulting mixture. The pigment slurry may be prepared by filtering the azo pigment prepared in 1) the synthesis of an azo pigment and dispersing the residue in a solvent. Alternatively, the reaction slurry prepared by the coupling reaction may be directly used as a pigment slurry. The solvent may be water and/or an organic solvent. Examples of the organic solvent include methanol, ethanol, n-propanol, and i-propanol. In particular, water is preferable from an economic viewpoint. The water may be either pure water or industrial water. Optionally, a buffer solution, such as an acetic acid buffer solution, a phosphoric acid buffer solution, a citric acid buffer solution, a citric acid-phosphoric acid buffer solution, a boric acid buffer solution, or a tartaric acid buffer solution, may be used. The amount of the azo pigment added is preferably 1 to 30 parts by mass relative to 100 parts by mass of the solvent. If the amount of the azo pigment added is small, productivity is low. On the other hand, if the amount of the azo pigment added is large, the viscosity of the pigment slurry is high and, consequently, stirring of the pigment slurry may require an excessive amount of energy. Therefore, the amount of the azo pigment added is more preferably 2 to 20 parts by mass. The temperature at which the step of preparation of the pigment slurry is conducted is preferably 0° C. to 100° C. The temperature at which the step of surface treatment of the pigment is conducted is preferably 0° C. to 100° C. and is more preferably 20° C. to 80° C. The amount of time during which the surface treatment of the pigment is performed is preferably 10 minutes to 2 hours.

In the case where the metal element is an iron element, iron compounds, such as iron sulfate, iron chloride, iron fluoride, iron bromide, iron iodide, iron nitrate, iron phosphorate, iron borate, iron carbonate, and iron acetate, can be used as a metal element. Iron sulfate, iron chloride, and iron nitrate are preferable from an economic viewpoint. A divalent iron and a trivalent iron can be used as iron. The iron compound may be an anhydride or a hydrate.

Hydrogen peroxide, a permanganic acid salt, hypochlorous acid, chlorous acid, chloric acid, perchloric acid, a peroxydisulfuric acid salt, chromic acid, dichromic acid, ozone, and the like can be used as an oxidizing agent. In particular, hydrogen peroxide diluted with water to a concentration of 5% to 60% by mass is preferable as an oxidizing agent. The amount of the metal compound used is, for example, 3 to 20 parts by mass and is preferably 5 to 15 parts by mass relative to 100 parts by mass of the azo pigment. The amount of the oxidizing agent used is not limited and may be an amount suitable for the oxidation reaction, which varies with concentration. The amount of the oxidizing agent used is, for example, 10 to 100 parts by mass and is preferably 20 to 80 parts by mass relative to 100 parts by mass of the azo pigment.

The metal compound and the oxidizing agent may be added to the pigment slurry together at a time or separately. In the case where the metal compound and the oxidizing agent are added to the pigment slurry together at a time, they may be mixed with each other before being added to the pigment slurry. In the case where they are added to the pigment slurry separately, either of the metal compound and the oxidizing agent may be added to the pigment slurry first. The oxidizing agent may be added to the pigment slurry in a dropwise manner or in one batch.

The azo pigment produced by the steps 1) and 2) above may optionally be further subjected to a common pigment treatment, such as particle size adjustment, pH adjustment, filtration, alcohol washing, water washing, drying, or pulverization. The size of particles of the azo pigment may be adjusted by heating, stirring, and then aging the azo pigment in water and/or an organic solvent under normal pressure or increased pressure. The particle size may also be adjusted by a publicly known method, such as an acid paste method, an acid slurry method, dry milling, a solvent method, or solvent milling. The surfaces of particles of the pigment may be treated with a pigment derivative, such as a sulfonic acid pigment derivative, an amino group-containing pigment derivative, or a phthalimidomethyl group-containing pigment derivative; a high-molecular-weight compound, such as a dispersant; a surfactant; a rosin; or the like. The above treatments may be performed either prior or subsequent to 2) the surface treatment of the synthesized pigment.

An inorganic pigment may be optionally added to the azo pigment produced by the steps 1) and 2) above in order to produce the azo pigment according to the present invention. Examples of the inorganic pigment include calcium carbonate, magnesium carbonate, precipitated barium sulfate, kaolin, clay, alumina white, and white carbon.

[Ink]

The ink according to the present invention is not limited and may be any ink that includes the azo pigment according to the present invention. The ink according to the present invention can be used in various applications, such as offset printing, gravure printing, flexographic printing, screen printing, and inkjet printing. Since the ink according to the present invention includes the azo pigment according to the present invention, the ink has a low viscosity and is excellent in terms of dispersibility of the pigment and transparency. Thus, the ink according to the present invention can be suitably used as an offset lithography ink for offset lithographic printing, a liquid ink for gravure printing or flexographic printing, or an inkjet ink.

An offset ink is an ink used in lithography (lithography with dampening water and waterless lithography without dampening water), letterpress printing, intaglio printing, screen printing, and various printing methods that are combinations of the above printing methods and transfer (offset) printing in which an ink deposited on the plate used in any of the above printing methods is transferred to an intermediate transfer body, such as a blanket, and subsequently printed on a printing object.

The offset lithography ink includes, in addition to the azo pigment according to the present invention, for example, components such as a resin varnish, an organic solvent, an oil and fat, such as an animal or vegetable oil, and an assistant (e.g., a drying retarder, a drier, or an abrasion resistance modifier). An offset lithography ink is produced by mixing the above components with one another as needed and milling and dispersing the resulting mixture with a roll mill or the like. The ink that can be applied to offset lithographic printing is an ink having a relatively high viscosity of 5 to 100 Pa·s.

Examples of the resin constituting the resin varnish include a rosin-modified phenolic resin, a petroleum resin, a petroleum resin-modified rosin-modified phenolic resin, an alkyd resin, a rosin ester, a vegetable oil-modified rosin-modified phenolic resin, a vegetable oil-modified rosin ester, a polyester, and an acrylic resin. Examples of the organic solvent include common solvents included in inks, such as a hydrocarbon solvent, an alcohol solvent, an ester solvent, and a ketone solvent.

Liquid inks used as a gravure ink or a flexographic ink are broadly classified into organic solvent-based liquid inks that include an organic solvent serving as a primary solvent and water-based liquid inks that include water serving as a primary solvent. The azo pigment according to the present invention can be applied to both organic solvent-based and water-based liquid inks.

The liquid ink includes, in addition to the azo pigment according to the present invention, for example, a binder resin, a solvent, and a dispersant. In the case where the principal component of the solvent is an organic solvent, an organic solvent-based liquid ink is produced. In the case where the principal component of the solvent is an aqueous solvent, such as a water-miscible organic solvent or water, a water-based liquid ink is produced.

The liquid ink can be produced by dispersing a mixture including a pigment and a binder resin with a disperser to prepare a pigment dispersion, adding a resin, a solvent, and additives, such as a leveling agent, as needed to the pigment dispersion, and subsequently stirring the resulting mixture. The viscosity of the liquid ink is preferably 10 mPa·s or more in order to reduce settling of pigment particles and disperse the pigment particles in an adequate manner and is preferably 1000 mPa·s or less in consideration of work efficiency in the production of the ink and printing.

The binder resin is not limited. The binder resins included in common liquid inks, such as a polyurethane resin, an acrylic resin, a vinyl chloride-vinyl acetate copolymer resin, a vinyl chloride-acrylic copolymer resin, a chlorinated poly-olefin resin, a modified polyolefin resin, cellulose, a cellulose derivative, a polyamide resin, an ethylene-vinyl acetate copolymer resin, a vinyl acetate resin, a styrene resin, a dammar resin, a styrene-maleic acid copolymer resin, a polyester resin, an alkyd resin, a polyvinyl chloride resin, a rosin resin, a rosin-modified maleic acid resin, a terpene resin, a phenol-modified terpene resin, a ketone resin, a cyclized rubber, a chlorinated rubber, butyral, a polyacetal resin, and a petroleum resin; and resins produced by modifying the above resins, can be used.

Examples of the organic solvent include aromatic hydrocarbon-based organic solvents, such as toluene, xylene, Solvesso #100, and Solvesso #150; aliphatic hydrocarbon-based organic solvents, such as hexane, methylcyclohexane, heptane, octane, and decane; and ester-based organic solvents, such as methyl acetate, ethyl acetate, isopropyl acetate, n-propyl acetate, butyl acetate, amyl acetate, ethyl formate, and butyl propionate. Examples of the water-miscible organic solvents include alcohol-based organic solvents, such as methanol, ethanol, propanol, butanol, and isopropyl alcohol; ketone-based organic solvents, such as acetone, methyl ethyl ketone, and cyclohexanone; and glycol ether-based organic solvents, such as ethylene glycol (mono,di)methyl ether, ethylene glycol (mono,di)ethyl ether, ethylene glycol monopropyl ether, ethylene glycol monoisopropyl ether, monobutyl ether, diethylene glycol (mono,di)methyl ether, diethylene glycol (mono,di)ethyl ether, diethylene glycol monoisopropyl ether, diethylene glycol monobutyl ether, triethylene glycol (mono,di)methyl ether, propylene glycol (mono,di)methyl ether, propylene glycol monopropyl ether, propylene glycol monobutyl ether, and dipropylene glycol (mono,di)methyl ether.

The ink according to the present invention includes the azo pigment according to the present invention and may further include, as a colorant, organic and inorganic pigments included in common inks, such as a printing ink, in combination with the azo pigment in an amount with which the organic and inorganic pigments do not adversely affect the advantageous effects of the present invention.

Examples of the organic pigment include a phthalocyanine-based pigment, a halogenated phthalocyanine-based pigment, an anthraquinone-based pigment, an anthanthrone-based pigment, a dianthraquinonyl-based pigment, an anthrapyrimidine-based pigment, a perylene-based pigment, a perinone-based pigment, a quinacridone-based pigment, a thioindigo-based pigment, a dioxazine-based pigment, an isoindolinone-based pigment, a quinophthalone-based pigment, an azomethine azo-based pigment, a flavanthrone-based pigment, a diketopyrrolopyrrole-based pigment, an isoindoline-based pigment, an indanthrone-based pigment, and a carbon black-based pigment. Examples of the inorganic pigment include white pigments, such as titanium oxide, zinc oxide, zinc sulfide, barium sulfate, calcium carbonate, chromium oxide, silica, lithopone, antimony white, and gypsum.

Examples of the inorganic pigment other than the above white pigments include aluminum particles, mica, a bronze powder, chromium vermilion, chrome yellow, cadmium yellow, cadmium red, ultramarine blue, Prussian blue, bengara, yellow iron oxide, iron black, and zircon.

The ink according to the present invention may optionally further include various additives, such as a wax, a chelate-based crosslinking agent, an extender pigment, a leveling agent, an antifoaming agent, a plasticizer, an infrared absorber, an ultraviolet absorber, a deodorizer, and a flame retardant.

In the case where the ink according to the present invention is an inkjet ink, the ink may include, in addition to the azo pigment according to the present invention, the above-described organic and inorganic pigments, a dye (e.g., an anionic azo, phthalocyanine, or an azo-based metal complex salt), a resin (e.g., a thermoplastic resin, such as an acrylic block copolymer, an acrylic resin, a maleic acid resin, a rosin, an epoxy resin, a silicone resin, or a butyral resin), a solvent (e.g., water, ketone, alcohol, or ethyl acetate), a penetrant (e.g., alcohol or glycol ether), a drying retarder (e.g., glycerin or glycol), a pH-controlling agent (e.g., alcohol amine or NaOH), a surfactant (e.g., a nonionic, cationic, or anionic surfactant), a conductivity imparting agent, a plasticizer, an antioxidant, a ultraviolet absorber, an antiseptic agent, a fungicide, and the like. The inkjet ink may be either a water-based or oil-based ink. The inkjet ink may be either a piezoelectric or thermal inkjet ink.

[Applications Other than Inks]

Since the azo pigment according to the present invention has excellent physical properties, that is, excellent transparency, suitable dispersibility, and a low viscosity, the azo pigment can be suitably used for various applications other than inks. Examples of the various applications include a paint, a colorant for plastics, a colorant for stationery and writing materials, a colored molded article, a printing agent, a toner, a dispersion and a resist for color filters, and a cosmetic material. The paint, the colorant for plastics, the colorant for stationery and writing materials, the printing agent, the toner, the dispersion and the resist for color filters, and the cosmetic material according to the present invention include the azo pigment according to the present invention.

The paint may be any paint that includes the azo pigment according to the present invention serving as a colorant. The type of the paint is not limited. The paint may be a synthetic plastic paint including an epoxy resin, a urethane resin, a fluororesin, a polyester resin, a melamine resin, a silicone resin, an acrylic resin, or the like, an oil-based paint, a water-based paint, a powder paint, a nitrocellulose resin paint (lacquer), or the like. The paint may be used for any application and any purpose and can be used for woods, metals, rubbers, plastics, or the like.

The colorant for plastics may be any colorant that includes the azo pigment according to the present invention serving as a colorant. The type of the colorant for plastics is not limited and may be a masterbatch, color pellets and compound, a dry color, a paste color, a liquid masterbatch, or the like. The above colored molded article is an article produced by molding a resin including the colorant for plastics.

The colorant for stationery and writing materials may be any colorant that includes the azo pigment according to the present invention serving as a colorant. The type of the colorant for stationery and writing materials is not limited. The colorant for stationery and writing materials may be included in ballpoint pens, marking pens, color pencils, colors, crayons, or the like.

The printing agent may be any printing agent that includes the azo pigment according to the present invention serving as a colorant. The type of the printing agent and the printing method are not limited. The printing agent can be used as a printing agent for hand printing (hand print turntables), machine printing (flat screen and rotary screen), dip dyeing, or the like. The printing agent may also be used for directly coloring (i.e., "coloring a raw-material solution") a raw material (e.g., a raw-material solution, a solution, or a polymer) of chemical fibers.

The toner may be any toner that includes the azo pigment according to the present invention serving as a colorant. The toner is used in laser beam printers and copying machines (in particular, magenta or yellow in color printing).

The dispersion or resist for color filters is a dispersion that includes pigment particles included in color filters for liquid crystals or the like which are dispersed in a solvent as a base or an ink that includes the above dispersion, a photosensitizing agent, and the like. The dispersion and the resist for color filters include the azo pigment according to the present invention serving as a pigment.

The cosmetic material may be any cosmetic material that includes the azo pigment according to the present invention serving as a colorant. The type of the cosmetic material, the application in which the cosmetic material is used, and the purpose for which the cosmetic material is used are not limited. Examples of the cosmetic material include foundations (e.g., face color and concealer); makeup base and pre-makeup; a face powder; a lipstick, a lip rouge, a lip color, a lip pencil, a muddy colored lipstick or rouge, a lip gloss, a lip liner, and the like; eye makeup products (e.g., eyeshadow, eye color, an eyeliner, an eyebrow paint, an eyebrow pencil, an eyebrow brush, mascara, and an eyelash cosmetic); cheek cosmetics (e.g., blush, a cheek color, and cheek rouge); nail cosmetics (e.g., nail enamel, manicure, a nail color, a nail polish, pedicure, a nail lacquer, a top coat, and a base coat); and hair colorants (e.g., a hair dye, a hair color spray, a hair color stick, a color conditioner, and hair manicure).

EXAMPLES

The present invention is described in further detail with reference to Examples and Comparative Examples below. In Examples and Comparative Examples below, "%" means "% by mass" unless otherwise specified. Azo pigments were synthesized by the methods described in Examples 1 to 9 and Comparative Examples 1 to 9 below. The zeta potentials of each of the azo pigments in isopropanol (IPA) and water, the content of an iron element in the azo pigment, and the concentrations of elements in the surfaces of particles of the azo pigment were measured by the methods described below.

In Examples below, zeta potentials in IPA were measured with a zeta potential-particle size-molecular weight measuring system ELSZ-2000Z (produced by Otsuka Electronics Co., Ltd.). First, 5 mg of a test sample and 5 mL of isopropanol (produced by Kanto Chemical Co., Inc.) were weighed and taken in a 30-mL sample bottle. Subsequently, dispersion was performed for 3 minutes with a desktop ultrasonic cleaner Bransonic M2800-J (produced by Branson). Then, 100 μL of the dispersion of the test sample and 10 mL of isopropanol (produced by Kanto Chemical Co., Inc.) were weighed and taken in a 30-mL sample bottle. Subsequently, dispersion was performed for 1 minute with Bransonic M2800-J. The resulting test solution was charged into a flow cell unit. The cell was placed in ELSZ-2000Z, and a scattering intensity was determined. When the scattering intensity fell within a proper measurement range (10000 to 50000 cps), the measurement was continued. If the scattering intensity deviated from the proper range, the concentration of the test sample was adjusted such that the scattering intensity fell within the proper range and, subsequently, the measurement was continued. The conditions under which the measurement was conducted with ELSZ-2000Z were as follows. The measurement was repeated three times, and the average thereof was considered as the zeta potential of the test sample in IPA.

[Measurement Conditions]
Temperature: 25° C.
Waiting time: 300 seconds
Pinholes: 50
Number of integration: 10
Cell measurement position: 0.70/0.35/0.00/−0.35/−0.70
Applied voltage: Fixed
Applied voltage (Fix): 100
Applied voltage waveform type: Auto
Constant current: 51 mA
Lorentz fit: 1 peak
Zeta potential conversion formula: Huckel In Examples below, zeta potentials in water were measured with ELSZ-2000Z as in IPA. First, 5 mg of a test sample and 5 mL of pure water were weighed and taken in a 30-mL sample bottle. Subsequently, dispersion was performed for 15 minutes with Bransonic M2800-J. Then, 100 μL of the dispersion of the test sample and 10 mL of pure water were weighed and taken in a 30-mL sample bottle. Subsequently, dispersion was performed for 1 minute with Bransonic M2800-J. The resulting test solution was charged into a flow cell unit. The cell was placed in ELSZ-2000Z, and a scattering intensity was determined. When the scattering intensity fell within a proper measurement range (10000 to 50000 cps), the measurement was continued. If the scattering intensity deviated from the proper range, the concentration of the test sample was adjusted such that the scattering intensity fell within the proper range and, subsequently, the measurement was continued. The conditions under which the measurement was conducted with ELSZ-2000Z were as follows. The measurement was repeated three times, and the average thereof was considered as the zeta potential of the test sample in water.

[Measurement Conditions]

Temperature: 25° C.
Waiting time: 300 seconds
Pinholes: 50
Number of integration: 10
Cell measurement position: 0.70/0.35/0.00/−0.35/−0.70
Applied voltage: Fixed
Applied voltage (Fix): 60
Applied voltage waveform type: Auto
Constant current: 51 mA
Lorentz fit: 1 peak
Zeta potential conversion formula: Smoluchows In Examples below, the content of an iron element in the azo pigment was measured using an energy-dispersive X-ray fluorescence spectrometer PANalytical Epsilon 5 (produced by Spectris).

In Examples below, the concentration of an element in the surfaces of particles of the azo pigment was measured by XPS (X-ray photoelectron spectroscopy). The measurement was conducted using an X-ray photoelectron spectrometer Quantera SXM (produced by Ulvac-Phi Incorporated). Note that the values of element concentrations were rounded off to one significant figure.

[Measurement Conditions]

X-ray source: AlKα (monochromator)
Measurement: Point measurement (100 μm), surface
Number of measurements: 3
Charge correction: C1s=284.8 eV (Comparative Example 1) [Synthesis of Comparative PR 57:1-1']

In 500 parts of water, 38.5 parts of 2-amino-5-methylbenzenesulfonic acid was dispersed. To the resulting solution, 25.0 parts of 35% hydrochloric acid was added. While the temperature was kept at 0° C., 36.8 parts of a 40% aqueous sodium nitrite solution was added dropwise to the solution. Hereby, a diazo solution was prepared. Subsequently, 42.5 parts of 2-hydroxy-3-naphthoic acid was dispersed in 200 parts of warm water having a temperature of 50° C. To the resulting solution, 74 parts of a 25% aqueous caustic soda solution was added. Hereby, a coupler solution was prepared. After the coupler solution had been cooled to 10° C., the diazo solution was added dropwise to the coupler solution while stirring was performed. After the stirring had been performed 60 minutes at 10° C., the coupling reaction was terminated. Hereby, a dye suspension was prepared. To the dye suspension, 77 parts (7.7 parts in terms of gum rosin) of a 10% solution of a Na salt of gum rosin was added. After the resulting mixture had been stirred for 30 minutes, a solution prepared by dissolving 37.4 parts of 72% calcium chloride in 40 parts of water was added to the mixture. Then, after the mixture had been stirred for 60 minutes, insolubilization was terminated. After the insolubilization reaction had been terminated, stirring was performed while heating was performed at 25° C. for 90 minutes. Hereby, a suspension of a calcium lake azo pigment (C.I. Pigment Red 57:1)

in water was prepared. The suspension was heated to 85° C. and subsequently stirred for 90 minutes. Then, filtration and water washing were performed. Hereby, a wet cake of C.I. Pigment Red 57:1 was prepared. The wet cake was dried for a whole day and night at 110° C. and subsequently pulverized. Hereby, comparative PR 57:1-1' including C.I. Pigment Red 57:1 was prepared. The zeta potentials of the comparative PR 57:1-1' in isopropanol and water were 1.2 mV and −5.1 mV, respectively. The content of the iron element in azo pigment was 18 ppm. The concentrations Fe and C of the iron and carbon elements in the surfaces of particles of the azo pigment which were measured by X-ray photoelectron spectroscopy were 0.0 atomic % and 67.7 atomic %, respectively. The ratio Fe/C therebetween was 0.00.

(Example 1) [Synthesis of PR 57:1-1]

In 500 parts of water, 38.5 parts of 2-amino-5-methylbenzenesulfonic acid was dispersed. To the resulting solution, 25.0 parts of 35% hydrochloric acid was added. While the temperature was kept at 0° C., 36.8 parts of a 40% aqueous sodium nitrite solution was added dropwise to the solution. Hereby, a diazo solution was prepared. Subsequently, 42.5 parts of 2-hydroxy-3-naphthoic acid was dispersed in 200 parts of warm water having a temperature of 50° C. To the resulting solution, 74 parts of a 25% aqueous caustic soda solution was added. Hereby, a coupler solution was prepared. After the coupler solution had been cooled to 10° C., the diazo solution was added dropwise to the coupler solution while stirring was performed. After the stirring had been performed 60 minutes at 10° C., the coupling reaction was terminated. Hereby, a dye suspension was prepared. To the dye suspension, 77 parts (7.7 parts in terms of gum rosin) of a 10% solution of a Na salt of gum rosin was added. After the resulting mixture had been stirred for 30 minutes, a solution prepared by dissolving 37.4 parts of 72% calcium chloride in 40 parts of water was added to the mixture. Then, after the mixture had been stirred for 60 minutes, insolubilization was terminated. After the insolubilization reaction had been terminated, stirring was performed while heating was performed at 25° C. for 90 minutes. Hereby, a suspension of a calcium lake azo pigment (C.I. Pigment Red 57:1) in water was prepared. The suspension was heated to 85° C. and subsequently stirred for 90 minutes. Then, filtration and water washing were performed. Hereby, a wet cake of C.I. Pigment Red 57:1 was prepared. The wet cake was added to 2500 parts of water, and the resulting mixture was stirred for 1 hour. Subsequently, 12.0 parts of iron(II) sulfate heptahydrate was added to the mixture, and the mixture was then stirred for 30 minutes. Subsequently, 37.5 parts of 35% hydrogen peroxide was added to the mixture, and the mixture was then stirred for 2 hours. After the pH of the reaction solution had been adjusted to 8.0 with a 25% aqueous caustic soda solution, 120 parts of 35% calcium chloride water was added to the reaction solution. Subsequently, stirring was performed for 30 minutes, and filtration was then performed. The residue was washed with water, then dried for a whole day and night at 110° C., and subsequently pulverized. Hereby, PR 57:1-1 including C.I. Pigment Red 57:1 was prepared. The zeta potentials of the PR 57:1-1 in isopropanol and water were −65.6 mV and −1.0 mV, respectively. The content of the iron element in azo pigment was 13780 ppm. The concentrations Fe and C of the iron and carbon elements in the surfaces of particles of the azo pigment which were measured by X-ray photoelectron spectroscopy were 0.8 atomic % and 65.2 atomic %, respectively. The ratio Fe/C therebetween was 0.012.

(Example 2) [Synthesis of PR 57:1-2]

In 500 parts of water, 38.5 parts of 2-amino-5-methyl-benzenesulfonic acid was dispersed. To the resulting solution, 25.0 parts of 35% hydrochloric acid was added. While the temperature was kept at 0° C., 36.8 parts of a 40% aqueous sodium nitrite solution was added dropwise to the solution. Hereby, a diazo solution was prepared. Subsequently, 42.5 parts of 2-hydroxy-3-naphthoic acid was dispersed in 200 parts of warm water having a temperature of 50° C. To the resulting solution, 74 parts of a 25% aqueous caustic soda solution was added. Hereby, a coupler solution was prepared. After the coupler solution had been cooled to 10° C., the diazo solution was added dropwise to the coupler solution while stirring was performed. After the stirring had been performed 60 minutes at 10° C., the coupling reaction was terminated. Hereby, a dye suspension was prepared. To the dye suspension, 77 parts (7.7 parts in terms of gum rosin) of a 10% solution of a Na salt of gum rosin was added. After the resulting mixture had been stirred for 30 minutes, a solution prepared by dissolving 37.4 parts of 72% calcium chloride in 40 parts of water and 6.0 parts of iron(II) sulfate heptahydrate were added to the mixture. Then, after the mixture had been stirred for 60 minutes, insolubilization was terminated. After the insolubilization reaction had been terminated, stirring was performed while heating was performed at 25° C. for 90 minutes. Hereby, a suspension of a calcium lake azo pigment (C.I. Pigment Red 57:1) in water was prepared. The suspension was heated to 85° C., and 37.5 parts of 35% hydrogen peroxide was then added to the suspension. Subsequently, stirring was performed for 90 minutes. Then, filtration and water washing were performed. Hereby, a wet cake of C.I. Pigment Red 57:1 was prepared. The wet cake was dried for a whole day and night at 110° C. and subsequently pulverized. Hereby, PR 57:1-2 including C.I. Pigment Red 57:1 was prepared. The zeta potential of the PR 57:1-2 in isopropanol was −33.0 mV. The content of the iron element in azo pigment was 630 ppm. The concentrations Fe and C of the iron and carbon elements in the surfaces of particles of the azo pigment which were measured by X-ray photoelectron spectroscopy were 0.0 atomic % and 66.8 atomic %, respectively. The ratio Fe/C therebetween was 0.00.

(Comparative Example 2) [Synthesis of Comparative PR 146-1']

Into 200 parts of warm water having a temperature of 50° C., 12.5 parts of N-(4-chloro-2,5-dimethoxyphenyl)-3-hydroxy-2-naphthamide was charged. To the resulting mixture, 0.6 parts of a turkey-red oil and 16 parts of a 25% aqueous caustic soda solution were added. Hereby, a coupler solution was prepared. In 100 parts of water, 8.0 parts of 3-amino-4-methoxybenzanilide was dispersed. To the resulting solution, 10 parts of 35% hydrochloric acid was added. While the temperature was kept at 0° C., 6 parts of a 40% aqueous sodium nitrite solution was added dropwise to the solution. Hereby, a diazo solution was prepared. After the coupler solution had been added to the diazo solution, the resulting mixture was heated to 85° C. and subsequently stirred for 60 minutes. Then, filtration and water washing were performed. Hereby, a wet cake of C.I. Pigment Red 146 was prepared. The wet cake was dried for a whole day and night at 110° C. and subsequently pulverized. Hereby, comparative PR 146-1' including C.I. Pigment Red 146 was prepared. The zeta potentials of the comparative PR 146-1' in isopropanol and water were −26.0 mV and −33.1 mV, respectively. The content of the iron element in azo pigment was 61 ppm. The concentrations Fe and C of the iron and carbon elements in the surfaces of particles of the azo pigment which were measured by X-ray photoelectron spectroscopy were 0.0 atomic % and 77.7 atomic %, respectively. The ratio Fe/C therebetween was 0.00.

(Example 3) [Synthesis of PR 146-1]

Into 200 parts of warm water having a temperature of 50° C., 12.5 parts of N-(4-chloro-2,5-dimethoxyphenyl)-3-hydroxy-2-naphthamide was charged. To the resulting mixture, 0.6 parts of a turkey-red oil and 16 parts of a 25% aqueous caustic soda solution were added. Hereby, a coupler solution was prepared. In 100 parts of water, 8.0 parts of 3-amino-4-methoxybenzanilide was dispersed. To the resulting solution, 10 parts of 35% hydrochloric acid was added. While the temperature was kept at 0° C., 6 parts of a 40% aqueous sodium nitrite solution was added dropwise to the solution. Hereby, a diazo solution was prepared. After the coupler solution had been added to the diazo solution, the resulting mixture was heated to 85° C. and subsequently stirred for 60 minutes. Then, filtration and water washing were performed. Hereby, a wet cake of C.I. Pigment Red 146 was prepared. The wet cake was added to 500 parts of water, and the resulting mixture was stirred for 1 hour. Subsequently, 0.58 parts of iron(II) sulfate heptahydrate was added to the mixture, and the mixture was then stirred for 30 minutes. Subsequently, 18.0 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PR 146-1 including C.I. Pigment Red 146 was prepared. The zeta potentials of the PR 146-1 in isopropanol and water were −46.3 mV and −30.5 mV, respectively. The content of the iron element in azo pigment was 1250 ppm. The concentrations Fe and C of the iron and carbon elements in the surfaces of particles of the azo pigment which were measured by X-ray photoelectron spectroscopy were 0.1 atomic % and 77.3 atomic %, respectively. The ratio Fe/C therebetween was 0.0013.

(Example 4) [Synthesis of PR 146-2]

Into 200 parts of warm water having a temperature of 50° C., 12.5 parts of N-(4-chloro-2,5-dimethoxyphenyl)-3-hydroxy-2-naphthamide was charged. To the resulting mixture, 0.6 parts of a turkey-red oil and 16 parts of a 25% aqueous caustic soda solution were added. Hereby, a coupler solution was prepared. In 100 parts of water, 8.0 parts of 3-amino-4-methoxybenzanilide was dispersed. To the resulting solution, 10 parts of 35% hydrochloric acid was added. While the temperature was kept at 0° C., 6 parts of a 40% aqueous sodium nitrite solution was added dropwise to the solution. Hereby, a diazo solution was prepared. After the coupler solution had been added to the diazo solution, the resulting mixture was heated to 85° C. and subsequently stirred for 60 minutes. Then, filtration and water washing were performed. Hereby, a wet cake of C.I. Pigment Red 146 was prepared. The wet cake was added to 500 parts of water, and the resulting mixture was stirred for 1 hour. Subsequently, 0.58 parts of iron(II) sulfate heptahydrate was added to the mixture, and the mixture was then stirred for 30 minutes.

Subsequently, 18.0 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PR 146-2 including C.I. Pigment Red 146 was prepared. The zeta potentials of the PR 146-2 in isopropanol and water were −68.5 mV and −36.4 mV, respectively. The content of the iron element in azo pigment was 5900 ppm. The concentrations Fe and C of the iron and carbon elements in the surfaces of particles of the azo pigment which were measured by X-ray photoelectron spectroscopy were 0.3 atomic % and 76.7 atomic %, respectively. The ratio Fe/C therebetween was 0.0039.

(Comparative Example 3) [Synthesis of Comparative PY 13-1']

To 4000 parts of water, a hydrochloric acid salt of 3,3'-dichlorobenzidine (in an amount corresponding to 250 parts of 3,3'-dichlorobenzidine) and 316 parts of 35% hydrochloric acid were added. After the resulting mixture had been cooled to 0° C., 358 parts of a 40% aqueous sodium nitrite solution was added to the mixture. Then, the mixture was stirred for 1 hour. Subsequently, 80 parts of 10% sulfamic acid was added to the mixture to eliminate an excessive part of sodium nitrite. Hereby, a tetrazo solution of 3,3'-dichlorobenzidine was prepared. To 7500 parts of water, 435 parts of acetoacetate-m-xylidide and 350 parts of a 25% aqueous caustic soda solution were added. The resulting mixture was stirred to form a solution. To the solution, 1500 parts of 10% acetic acid was added in small amounts to prepare a coupler suspension. Subsequently, the tetrazo solution was added to the coupler suspension over 2 hours while the temperature was kept at 15° C. to 17° C. After stirring had been performed for 1 hour, the temperature was increased to 90° C. and then stirring was performed for 2 hours. Subsequently, filtration and water washing were performed. Hereby, a wet cake of C.I. Pigment Yellow 13 was prepared. The wet cake was dried for a whole day and night at 110° C. and subsequently pulverized. Hereby, comparative PY 13-1' including C.I. Pigment Yellow 13 was prepared. The zeta potential of the comparative PY 13-1' in isopropanol was 5.7 mV. The content of the iron element in azo pigment was 250 ppm. The concentrations Fe and C of the iron and carbon elements in the surfaces of particles of the azo pigment which were measured by X-ray photoelectron spectroscopy were 0.0 atomic % and 76.5 atomic %, respectively. The ratio Fe/C therebetween was 0.00.

(Example 5) [Synthesis of PY 13-1]

To 4000 parts of water, a hydrochloric acid salt of 3,3'-dichlorobenzidine (in an amount corresponding to 250 parts of 3,3'-dichlorobenzidine) and 316 parts of 35% hydrochloric acid were added. After the resulting mixture had been cooled to 0° C., 358 parts of a 40% aqueous sodium nitrite solution was added to the mixture. Then, the mixture was stirred for 1 hour. Subsequently, 80 parts of 10% sulfamic acid was added to the mixture to eliminate an excessive part of sodium nitrite. Hereby, a tetrazo solution of 3,3'-dichlorobenzidine was prepared. To 7500 parts of water, 435 parts of acetoacetate-m-xylidide and 350 parts of a 25% aqueous caustic soda solution were added. The resulting mixture was stirred to form a solution. To the solution, 1500 parts of 10% acetic acid was added in small amounts to prepare a coupler suspension. Subsequently, the tetrazo solution was added to the coupler suspension over 2 hours while the temperature was kept at 15° C. to 17° C. After stirring had been performed for 1 hour, the temperature was increased to 90° C. and then stirring was performed for 2 hours. Subsequently, filtration and water washing were performed. Hereby, a wet cake of C.I. Pigment Yellow 13 was prepared. The wet cake was added to 10000 parts of water, and the resulting mixture was stirred for 1 hour. Subsequently, 43.0 parts of iron(II) sulfate heptahydrate was added to the mixture, and the mixture was then stirred for 30 minutes. Subsequently, 1000 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PY 13-1 including C.I. Pigment Yellow 13 was prepared. The zeta potential of the PY 13-1 in isopropanol was −45.1 mV. The content of the iron element in azo pigment was 4870 ppm. The concentrations Fe and C of the iron and carbon elements in the surfaces of particles of the azo pigment which were measured by X-ray photoelectron spectroscopy were 0.2 atomic % and 75.9 atomic %, respectively. The ratio Fe/C therebetween was 0.0026.

(Comparative Example 4) [Synthesis of Comparative PY 83-1']

To 350 parts of water, a hydrochloric acid salt of 3,3'-dichlorobenzidine (in an amount corresponding to 21.8 parts of 3,3'-dichlorobenzidine) and 34.3 parts of 35% hydrochloric acid were added. After the resulting mixture had been cooled to 0° C., 31.4 parts of a 40% aqueous sodium nitrite solution was added to the mixture. Then, the mixture was stirred for 1 hour. Subsequently, 7.6 parts of 10% sulfamic acid was added to the mixture to eliminate an excessive part of sodium nitrite. Hereby, a tetrazo solution of 3,3'-dichlorobenzidine was prepared. To 400 parts of water, 49.9 parts of 4'-chloro-2',5'-dimethoxyacetacetanilide and 48.0 parts of a 25% aqueous caustic soda solution were added. The resulting mixture was stirred to form a solution. The amount of the solution was adjusted to 500 parts with water. Hereby, a coupler solution was prepared. Subsequently, 800 parts of water and 5.3 parts of acetic acid were added to a reaction container equipped with a stirrer. While the temperature was kept at 20° C., the resulting mixture was stirred and a part of the coupler solution was added to the mixture to adjust the pH to 5.5. Then, the tetrazo solution and the coupler solution were added dropwise to the reaction container over 3 hours simultaneously. In order to keep the temperature of the reaction solution at 20° C. and the pH of the reaction solution at 5.4 to 5.6, ice or a 5% aqueous caustic soda solution was added to the container as needed. After the whole amounts of the tetrazo solution and the coupler solution had been added, the pH was adjusted to 11.0 with a 5% aqueous caustic soda solution. Then, the temperature was increased to 90° C. and stirring was performed for 40 minutes. Subsequently, the temperature was reduced to 70° C., and the pH was adjusted to 6.5 with 35% hydrochloric acid. Then, stirring was performed for 10 minutes. Subsequently, filtration and water washing were performed. Hereby, a wet cake of C.I. Pigment Yellow 83 was prepared. The wet cake was dried for a whole day and night at 110° C. and subsequently pulverized. Hereby, comparative PY 83-1' including C.I. Pigment Yellow 83 was prepared. The zeta potential of the comparative PY 83-1' in isopropanol was 17.3 mV. The content of the iron element in azo pigment was 185 ppm. The concentrations Fe and C of the iron and carbon elements in the surfaces of particles of the azo pigment which were measured by X-ray photoelectron spectroscopy were 0.0 atomic % and 67.5 atomic %, respectively. The ratio Fe/C therebetween was 0.00.

(Comparative Example 5) [Synthesis of Comparative PY 83-2']

To 350 parts of water, a hydrochloric acid salt of 3,3'-dichlorobenzidine (in an amount corresponding to 21.8 parts of 3,3'-dichlorobenzidine) and 34.3 parts of 35% hydrochloric acid were added. After the resulting mixture had been cooled to 0° C., 31.4 parts of a 40% aqueous sodium nitrite solution was added to the mixture. Then, the mixture was stirred for 1 hour. Subsequently, 7.6 parts of 10% sulfamic acid was added to the mixture to eliminate an excessive part of sodium nitrite. Hereby, a tetrazo solution of 3,3'-dichlorobenzidine was prepared. To 400 parts of water, 49.9 parts of 4'-chloro-2',5'-dimethoxyacetacetanilide and 48.0 parts of a 25% aqueous caustic soda solution were added. The resulting mixture was stirred to form a solution. The amount of the solution was adjusted to 500 parts with water. Hereby, a coupler solution was prepared. Subsequently, 800 parts of water and 5.3 parts of acetic acid were added to a reaction container equipped with a stirrer. While the temperature was kept at 20° C., the resulting mixture was stirred and a part of the coupler solution was added to the mixture to adjust the pH to 5.5. Then, the tetrazo solution and the coupler solution were added dropwise to the reaction container over 3 hours simultaneously. In order to keep the temperature of the reaction solution at 20° C. and the pH of the reaction solution at 5.4 to 5.6, ice or a 5% aqueous caustic soda solution was added to the container as needed. After the whole amounts of the tetrazo solution and the coupler solution had been added, the pH was adjusted to 11.0 with a 5% aqueous caustic soda solution. Then, the temperature was increased to 90° C. and stirring was performed for 40 minutes. Subsequently, the temperature was reduced to 70° C., and the pH was adjusted to 6.5 with 35% hydrochloric acid. Then, stirring was performed for 10 minutes. Subsequently, filtration and water washing were performed. Hereby, a wet cake of C.I. Pigment Yellow 83 was prepared. The wet cake was added to 1500 parts of water, and the resulting mixture was stirred for 1 hour. Subsequently, 100 parts of 35% hydrogen peroxide was added to the mixture, and the mixture was further stirred for 2 hours. Subsequently, filtration was performed. The residue was washed with water, then dried for a whole day and night at 110° C., and subsequently pulverized. Hereby, comparative PY 83-2' including C.I. Pigment Yellow 83 was prepared. The zeta potential of the comparative PY 83-2' in isopropanol was 10.8 mV. The content of the iron element in azo pigment was 58 ppm. The concentrations Fe and C of the iron and carbon elements in the surfaces of the azo pigment which were measured by X-ray photoelectron spectroscopy were 0.0 atomic % and 67.6 atomic %, respectively. The ratio Fe/C therebetween was 0.00.

(Example 6) [Synthesis of PY 83-1]

To 350 parts of water, a hydrochloric acid salt of 3,3'-dichlorobenzidine (in an amount corresponding to 21.8 parts of 3,3'-dichlorobenzidine) and 34.3 parts of 35% hydrochloric acid were added. After the resulting mixture had been cooled to 0° C., 31.4 parts of a 40% aqueous sodium nitrite solution was added to the mixture. Then, the mixture was stirred for 1 hour. Subsequently, 7.6 parts of 10% sulfamic acid was added to the mixture to eliminate an excessive part of sodium nitrite. Hereby, a tetrazo solution of 3,3'-dichlorobenzidine was prepared. To 400 parts of water, 49.9 parts of 4'-chloro-2',5'-dimethoxyacetacetanilide and 48.0 parts of a 25% aqueous caustic soda solution were added. The resulting mixture was stirred to form a solution. The amount of the solution was adjusted to 500 parts with water. Hereby, a coupler solution was prepared. Subsequently, 800 parts of water and 5.3 parts of acetic acid were added to a reaction container equipped with a stirrer. While the temperature was kept at 20° C., the resulting mixture was stirred and a part of the coupler solution was added to the mixture to adjust the pH to 5.5. Then, the tetrazo solution and the coupler solution were added dropwise to the reaction container over 3 hours simultaneously. In order to keep the temperature of the reaction solution at 20° C. and the pH of the reaction solution at 5.4 to 5.6, ice or a 5% aqueous caustic soda solution was added to the container as needed. After the whole amounts of the tetrazo solution and the coupler solution had been added, the pH was adjusted to 11.0 with a 5% aqueous caustic soda solution. Then, the temperature was increased to 90° C. and stirring was performed for 40 minutes. Subsequently, the temperature was reduced to 70° C., and the pH was adjusted to 6.5 with 35% hydrochloric acid. Then, stirring was performed for 10 minutes. Subsequently, filtration and water washing were performed. Hereby, a wet cake of C.I. Pigment Yellow 83 was prepared. The wet cake was added to 1500 parts of water, and the resulting mixture was stirred for 1 hour. Then, 3.0 parts of iron(II) sulfate heptahydrate was added to the mixture, and stirring was performed for 30 minutes. Subsequently, 100 parts of 35% hydrogen peroxide was added to the mixture, and the mixture was further stirred for 2 hours. Subsequently, filtration was performed. The residue was washed with water, then dried for a whole day and night at 110° C., and subsequently pulverized. Hereby, PY 83-1 including C.I. Pigment Yellow 83 was prepared. The zeta potential of the PY 83-1 in isopropanol was −42.2 mV. The content of the iron element in azo pigment was 3480 ppm. The concentrations Fe and C of the iron and carbon elements in the surfaces of particles of the azo pigment which were measured by X-ray photoelectron spectroscopy were 0.1 atomic % and 67.1 atomic %, respectively. The ratio Fe/C therebetween was 0.0015.

(Comparative Example 6) [Synthesis of Comparative PO 13-1']

To 4000 parts of water, a hydrochloric acid salt of 3,3'-dichlorobenzidine (in an amount corresponding to 300 parts of 3,3'-dichlorobenzidine) and 420 parts of 35% hydrochloric acid were added. After the resulting mixture had been cooled to 0° C., 430 parts of a 40% aqueous sodium nitrite solution was added to the mixture. Then, the mixture was stirred for 1 hour. Subsequently, 100 parts of 10% sulfamic acid was added to the mixture to eliminate an excessive part of sodium nitrite. Hereby, a tetrazo solution of 3,3'-dichlorobenzidine was prepared. To 7500 parts of water, 427 parts of 3-methyl-1-phenyl-5-pyrazolone and 520 parts of a 25% aqueous caustic soda solution were added, and the resulting mixture was stirred to form a solution. To the solution, 3000 parts of 10% acetic acid was added in small amounts. The pH was adjusted to 6.5 using a 20% aqueous caustic soda solution. Hereby, a coupler suspension was prepared. To the coupler suspension, the tetrazo solution was added while the temperature was kept at 30° C. to 40° C. After stirring had been performed for 30 minutes, the temperature was increased to 90° C. and then stirring was performed for 30 minutes. Subsequently, filtration and water washing were performed. Hereby, a wet cake of C.I. Pigment Orange 13 was prepared. The wet cake was dried for a whole day and night at 110° C. and subsequently pulverized. Hereby, comparative PO 13-1' including C.I. Pigment Orange 13 was prepared. The zeta potential of the comparative PO 13-1' in isopropanol was −25.5 mV. The content of the iron element in azo pigment was 87 ppm. The concentrations Fe and C of the iron and carbon elements in the surfaces of particles of the azo pigment which were measured by X-ray photoelectron spectroscopy were 0.0 atomic % and 73.5 atomic %, respectively. The ratio Fe/C therebetween was 0.00.

(Example 7) [Synthesis of PO 13-1]

To 4000 parts of water, a hydrochloric acid salt of 3,3'-dichlorobenzidine (in an amount corresponding to 300 parts of 3,3'-dichlorobenzidine) and 420 parts of 35% hydrochloric acid were added. After the resulting mixture had been cooled to 0° C., 430 parts of a 40% aqueous sodium nitrite solution was added to the mixture. Then, the mixture was stirred for 1 hour. Subsequently, 100 parts of 10% sulfamic acid was added to the mixture to eliminate an excessive part of sodium nitrite. Hereby, a tetrazo solution of 3,3'-dichlorobenzidine was prepared. To 7500 parts of water, 427 parts of 3-methyl-1-phenyl-5-pyrazolone and 520 parts of a 25% aqueous caustic soda solution were added, and the resulting mixture was stirred to form a solution. To the solution, 3000 parts of 10% acetic acid was added in small amounts. The pH was adjusted to 6.5 using a 20% aqueous caustic soda solution. Hereby, a coupler suspension was prepared. To the coupler suspension, the tetrazo solution was added while the temperature was kept at 30° C. to 40° C. After stirring had been performed for 30 minutes, the temperature was increased to 90° C. and then stirring was performed for 30 minutes. Subsequently, filtration and water washing were performed. Hereby, a wet cake of C.I. Pigment Orange 13 was prepared. The wet cake was added to 10000 parts of water, and the resulting mixture was stirred for 1 hour. Subsequently, 43.0 parts of iron(II) sulfate heptahydrate was added to the mixture, and the mixture was then stirred for 30 minutes. Subsequently, 1000 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PO 13-1 including C.I. Pigment Orange 13 was prepared. The zeta potential of the PO 13-1 in isopropanol was −45.8 mV. The content of the iron element in azo pigment was 4890 ppm. The concentrations Fe and C of the iron and carbon elements in the surfaces of particles of the azo pigment which were measured by X-ray photoelectron spectroscopy were 0.1 atomic % and 71.7 atomic %, respectively. The ratio Fe/C therebetween was 0.0014.

(Comparative Example 7) [Synthesis of Comparative PY 55-1']

To 4000 parts of water, a hydrochloric acid salt of 3,3'-dichlorobenzidine (in an amount corresponding to 300 parts of 3,3'-dichlorobenzidine) and 380 parts of 35% hydrochloric acid were added. After the resulting mixture had been cooled to 0° C., 430 parts of a 40% aqueous sodium nitrite solution was added to the mixture. Then, the mixture was stirred for 1 hour. Subsequently, 100 parts of 10% sulfamic acid was added to the mixture to eliminate an excessive part of sodium nitrite. Hereby, a tetrazo solution of 3,3'-dichlorobenzidine was prepared. To 7500 parts of water, 480 parts of acetoacetic-p-toluidide and 270 parts of a 25% aqueous caustic soda solution were added, and the resulting mixture was stirred to form a solution. To the solution, 1500 parts of 10% acetic acid was added in small amounts. Hereby, a coupler suspension was prepared. To the coupler suspension, the tetrazo solution was added while the temperature was kept at 2° C. to 10° C. After stirring had been performed for 30 minutes, the temperature was increased to 80° C. and then stirring was performed for 30 minutes. Subsequently, filtration and water washing were performed. Hereby, a wet cake of C.I. Pigment Yellow 55 was prepared. The wet cake was dried for a whole day and night at 110° C. and subsequently pulverized. Hereby, comparative PY 55-1' including C.I. Pigment Yellow 55 was prepared. The zeta potential of the comparative PY 55-1' in isopropanol was −29.5 mV. The content of the iron element in azo pigment was 124 ppm. The concentrations Fe and C of the iron and carbon elements in the surfaces of particles of the azo pigment which were measured by X-ray photoelectron spectroscopy were 0.0 atomic % and 73.5 atomic %, respectively. The ratio Fe/C therebetween was 0.00.

(Example 8) [Synthesis of PY 55-1]

To 4000 parts of water, a hydrochloric acid salt of 3,3'-dichlorobenzidine (in an amount corresponding to 300 parts of 3,3'-dichlorobenzidine) and 380 parts of 35% hydrochloric acid were added. After the resulting mixture had been cooled to 0° C., 430 parts of a 40% aqueous sodium nitrite solution was added to the mixture. Then, the mixture was stirred for 1 hour. Subsequently, 100 parts of 10% sulfamic acid was added to the mixture to eliminate an excessive part of sodium nitrite. Hereby, a tetrazo solution of 3,3'-dichlorobenzidine was prepared. To 7500 parts of water, 480 parts of acetoacetic-p-toluidide and 270 parts of a 25% aqueous caustic soda solution were added, and the resulting mixture was stirred to form a solution. To the solution, 1500 parts of 10% acetic acid was added in small amounts. Hereby, a coupler suspension was prepared. To the coupler suspension, the tetrazo solution was added while the temperature was kept at 2° C. to 10° C. After stirring had been performed for 30 minutes, the temperature was increased to 80° C. and then stirring was performed for 30 minutes. Subsequently, filtration and water washing were performed. Hereby, a wet cake of C.I. Pigment Yellow 55 was prepared. The wet cake was added to 10000 parts of water, and the resulting mixture was stirred for 1 hour. Subsequently, 43.0 parts of iron(II) sulfate heptahydrate was added to the mixture, and the mixture was then stirred for 30 minutes. Subsequently, 1000 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PY55-1 including C.I. Pigment Yellow 55 was prepared. The zeta potential of the PY 55-1 in isopropanol was −59.2 mV. The content of the iron element in azo pigment was 2410 ppm. The concentrations Fe and C of the iron and carbon elements in the surfaces of particles of the azo pigment which were measured by X-ray photoelectron spectroscopy were 0.1 atomic % and 72.2 atomic %, respectively. The ratio Fe/C therebetween was 0.0014.

(Comparative Example 8) [Synthesis of Comparative PY 180-1']

To 650 parts of water, 45 parts of 1,2-bis(2-aminophenoxy)-ethane and 107.7 parts of 35% hydrochloric acid were added. After the resulting mixture had been stirred for 30 minutes, while the temperature was kept at 5° C. or less by the addition of ice, 67.4 parts of a 40% aqueous sodium nitrite solution was added dropwise to the liquid mixture. The amount of the liquid was adjusted to 1300 parts with water. Hereby, a tetrazo solution was prepared. To 675 parts of water, 93 parts of 5-acetoacetylamino-benzimidazolone was added. While the resulting mixture was stirred, 119 parts of a 25% aqueous sodium hydroxide solution was added to the mixture to form a solution. The amount of the liquid was adjusted to 900 parts with water. Hereby, a coupler solution was prepared. With 1300 parts of water, 6 parts of 90% acetic acid was mixed. While the temperature was kept at 20° C., the pH was adjusted to 6.0 with a 20% aqueous caustic soda solution. Then, the tetrazo solution and the coupler solution were added dropwise to the above solution over 3 hours simultaneously. In order to keep the temperature of the reaction solution at 20° C. and the pH of the reaction solution at 6.0, ice or a 5% aqueous caustic soda solution was added to the solution as needed. Subsequently, the temperature was increased to 90° C., and stirring was performed for 1 hour. Then, filtration was performed. The residue was washed with water and then dried for a whole day and night at 110° C. Hereby, dry pigment blocks including C.I. Pigment Yellow 180 were prepared. Into a 1-L double arm kneader (produced by Yoshida Seisakusho Co., Ltd.), 60 parts of the dry pigment blocks, 340 parts of sodium chloride, and 70 parts of diethylene glycol were charged, and milling was performed at 80° C. for 5 hours. The milled and kneaded material was added to 2000 parts of water. The resulting mixture was heated to 60° C. and then stirred for 1 hour. Subsequently, filtration and water washing were performed. Hereby, a wet cake of C.I. Pigment Yellow 180 was prepared. The wet cake was dried for a whole day and night at 110° C. and subsequently pulverized. Hereby, comparative PY 180-1' including C.I. Pigment Yellow 180 was prepared. The zeta potentials of the comparative PY 180-1' in isopropanol and water were −12.4 mV and −34.9 mV, respectively. The content of the iron element in azo pigment was 455 ppm. The concentrations Fe and C of the iron and carbon elements in the surfaces of particles of the azo pigment which were measured by X-ray photoelectron spectroscopy were 0.0 atomic % and 69.2 atomic %, respectively. The ratio Fe/C therebetween was 0.00.

(Comparative Example 9) [Synthesis of Comparative PY 180-2']

To 650 parts of water, 45 parts of 1,2-bis(2-aminophenoxy)-ethane and 107.7 parts of 35% hydrochloric acid were added. After the resulting mixture had been stirred for 30 minutes, while the temperature was kept at 5° C. or less by the addition of ice, 67.4 parts of a 40% aqueous sodium nitrite solution was added dropwise to the liquid mixture. The amount of the liquid was adjusted to 1300 parts with water. Hereby, a tetrazo solution was prepared. To 675 parts of water, 93 parts of 5-acetoacetylamino-benzimidazolone was added. While the resulting mixture was stirred, 119 parts of a 25% aqueous sodium hydroxide solution was added to the mixture to form a solution. The amount of the liquid was adjusted to 900 parts with water. Hereby, a coupler solution was prepared. With 1300 parts of water, 6 parts of 90% acetic acid was mixed. While the temperature was kept at 20° C., the pH was adjusted to 6.0 with a 20% aqueous caustic soda solution. Then, the tetrazo solution and the coupler solution were added dropwise to the above solution over 3 hours simultaneously. In order to keep the temperature of the reaction solution at 20° C. and the pH of the reaction solution at 6.0, ice or a 5% aqueous caustic soda solution was added to the solution as needed. Subsequently, the temperature was increased to 90° C., and stirring was performed for 1 hour. Then, filtration was performed. The residue was washed with water and then dried for a whole day and night at 110° C. Hereby, dry pigment blocks including C.I. Pigment Yellow 180 were prepared. Into a 1-L double arm kneader (produced by Yoshida Seisakusho Co., Ltd.), 60 parts of the dry pigment blocks, 340 parts of sodium chloride, and 70 parts of diethylene glycol were charged, and milling was performed at 80° C. for 5 hours. The milled and kneaded material was added to 2000 parts of water. The resulting mixture was heated to 60° C. and then stirred for 1 hour. Subsequently, filtration and water washing were performed. Hereby, a wet cake of C.I. Pigment Yellow 180 was prepared. The wet cake was added to 1000 parts of water, and the resulting mixture was stirred for 1 hour. Subsequently, 70 parts of 35% hydrogen peroxide was added to the mixture, and the mixture was further stirred for 2 hours. Subsequently, filtration was performed. The residue was washed with water, then dried for a whole day and night at 110° C., and subsequently pulverized. Hereby, comparative PY 180-2' including C.I. Pigment Yellow 180 was prepared. The zeta potential of the comparative PY 180-2' in isopropanol was −18.5 mV. The content of the iron element in azo pigment was 434 ppm. The concentrations Fe and C of the iron and carbon elements in the surfaces of particles of the azo pigment which were measured by X-ray photoelectron spectroscopy were 0.0 atomic % and 68.5 atomic %, respectively. The ratio Fe/C therebetween was 0.00.

(Example 9) [Synthesis of PY 180-1]

To 650 parts of water, 45 parts of 1,2-bis(2-aminophenoxy)-ethane and 107.7 parts of 35% hydrochloric acid were added. After the resulting mixture had been stirred for 30 minutes, while the temperature was kept at 5° C. or less by the addition of ice, 67.4 parts of a 40% aqueous sodium nitrite solution was added dropwise to the liquid mixture. The amount of the liquid was adjusted to 1300 parts with water. Hereby, a tetrazo solution was prepared. To 675 parts of water, 93 parts of 5-acetoacetylamino-benzimidazolone was added. While the resulting mixture was stirred, 119 parts of a 25% aqueous sodium hydroxide solution was added to the mixture to form a solution. The amount of the liquid was adjusted to 900 parts with water. Hereby, a coupler solution was prepared. With 1300 parts of water, 6 parts of 90% acetic acid was mixed. While the temperature was kept at 20° C., the pH was adjusted to 6.0 with a 20% aqueous caustic soda solution. Then, the tetrazo solution and the coupler solution were added dropwise to the above solution over 3 hours simultaneously. In order to keep the temperature of the reaction solution at 20° C. and the pH of the reaction solution at 6.0, ice or a 5% aqueous caustic soda solution was added to the solution as needed. Subsequently, the temperature was increased to 90° C., and stirring was performed for 1 hour. Then, filtration was performed. The residue was washed with water and then dried for a whole day and night at 110° C. Hereby, dry pigment blocks including C.I. Pigment Yellow 180 were prepared. Into a 1-L double arm kneader (produced by Yoshida Seisakusho Co., Ltd.), 60 parts of the dry pigment blocks, 340 parts of sodium chloride, and 70 parts of diethylene glycol were charged, and milling was performed at 80° C. for 5 hours. The milled and kneaded material was added to 2000 parts of water. The resulting mixture was heated to 60° C. and then stirred for 1 hour. Subsequently, filtration and water washing were performed. Hereby, a wet cake of C.I. Pigment Yellow 180 was prepared. The wet cake was added to 1000 parts of water, and the resulting mixture was stirred for 1 hour. Subsequently, 2.86 parts of iron(II) sulfate heptahydrate was added to the mixture, and the mixture was then stirred for 30 minutes. Subsequently, 70 parts of 35% hydrogen peroxide was added to the mixture, and the mixture was then stirred for 2 hours. Subsequently, filtration was performed. The residue was washed with water, then dried for a whole day and night at 110° C., and subsequently pulverized. Hereby, PY 180-1 including C.I. Pigment Yellow 180 was prepared. The zeta potentials of the PY 180-1 in isopropanol and water were −38.8 mV and −36.4 mV, respectively. The content of the iron element in azo pigment was 4460 ppm. The concentrations Fe and C of the iron and carbon elements in the surfaces of particles of the azo pigment which were measured by X-ray photoelectron spectroscopy were 0.1 atomic % and 67.4 atomic %, respectively. The ratio Fe/C therebetween was 0.0015.

(Comparative Example 10) [Synthesis of Comparative PR 213-1′]

To 429 parts of water, 71.5 parts of a wet cake of C.I. Pigment Red 213 (solid content: 35.0%, produced by Tokyo Shikizai Industry Co., Ltd.) was added. The resulting mixture was stirred for 1 hour while the temperature was increased to 60° C. Subsequently, the mixture was further stirred at 60° C. for another 2 hours 30 minutes. Subsequently, filtration was performed. The residue was washed with water, then dried for a whole day and night at 110° C., and subsequently pulverized. Hereby, comparative PR 213-1′ including C.I. Pigment Red 213 was prepared. The zeta potential of the comparative PR 213-1′ in isopropanol was 27.1 mV. The content of the iron element in azo pigment was 16 ppm. The concentrations Fe and C of the iron and carbon elements in the surfaces of particles of the azo pigment which were measured by X-ray photoelectron spectroscopy were 0.0 atomic % and 75.1 atomic %, respectively. The ratio Fe/C therebetween was 0.00.

(Example 10) [Synthesis of PR 213-1]

To 429 parts of water, 71.5 parts of a wet cake of C.I. Pigment Red 213 (solid content: 35.0%, produced by Tokyo Shikizai Industry Co., Ltd.) was added. The resulting mixture was stirred for 1 hour while the temperature was increased to 60° C. To the mixture, 1.13 parts of iron(II) sulfate heptahydrate was added, and stirring was then performed for 30 minutes. Subsequently, 35.7 parts of 35% hydrogen peroxide was added to the mixture, and stirring was then performed for 1 hour. Then, 0.28 parts of iron(II) sulfate heptahydrate was added to the mixture, and stirring was then performed for 1 hour. Subsequently, filtration was performed. The residue was washed with water, then dried for a whole day and night at 110° C., and subsequently pulverized. Hereby, PR 213-1 including C.I. Pigment Red 213 was prepared. The zeta potential of the PR 213-1 in isopropanol was −38.8 mV. The content of the iron element in azo pigment was 505 ppm. The concentrations Fe and C of the iron and carbon elements in the surfaces of particles of the azo pigment which were measured by X-ray photo-electron spectroscopy were 0.1 atomic % and 74.3 atomic %, respectively. The ratio Fe/C therebetween was 0.0013.

(Comparative Example 11) [Synthesis of Comparative PO 64-1′]

To 449 parts of water, 50.7 parts of a wet cake of C.I. Pigment Orange 64 (solid content: 49.3%, produced by Vijay Chemical Industries) was added. The resulting mixture was stirred for 1 hour while the temperature was increased to 60° C. Subsequently, the mixture was further stirred at 60° C. for another 2 hours. Subsequently, filtration was performed. The residue was washed with water, then dried for a whole day and night at 98° C., and subsequently pulverized. Hereby, comparative PO 64-1′ including C.I. Pigment Orange 64 was prepared. The zeta potential of the comparative PO 64-1′ in isopropanol was 2.7 mV. The content of the iron element in azo pigment was 20 ppm. The concentrations Fe and C of the iron and carbon elements in the surfaces of particles of the azo pigment which were measured by X-ray photoelectron spectroscopy were 0.0 atomic % and 59.4 atomic %, respectively. The ratio Fe/C therebetween was 0.00.

(Example 11) [Synthesis of PO 64-1]

To 449 parts of water, 50.7 parts of a wet cake of C.I. Pigment Orange 64 (solid content: 49.3%, produced by Vijay Chemical Industries) was added. To the resulting mixture, 1.14 parts of iron(II) sulfate heptahydrate was added. Then, the mixture was stirred for 1 hour while the temperature was increased to 60° C. To the resulting pigment slurry, 35.7 parts of 35% hydrogen peroxide was added dropwise over 1 hour. Subsequently, 0.29 parts of iron(II) sulfate heptahydrate was further added to the pigment slurry. Then, the pigment slurry was stirred for 1 hour and subsequently filtered. The residue was washed with water, then dried for a whole day and night at 98° C., and subsequently pulverized. Hereby, PO 64-1 including C.I. Pigment Orange 64 was prepared. The zeta potential of the PO 64-1 in isopropanol was −41.0 mV. The content of the iron element in azo pigment was 6390 ppm. The concentrations Fe and C of the iron and carbon elements in the surfaces of particles of the azo pigment which were measured by X-ray photo-electron spectroscopy were 0.1 atomic % and 58.1 atomic %, respectively. The ratio Fe/C therebetween was 0.0017.

[Preparation of Polyurethane Inks]

For each of the azo pigments prepared in Examples 1 to 11 and Comparative Examples 1 to 11 above, 10 g of the pigment, 20 g of a polyurethane resin SANPRENE IB-501 (produced by Sanyo Chemical Industries, Ltd.), 13 g of ethyl acetate, 7 g of isopropyl alcohol, and 180 g of ⅛-inch steel beads (produced by Mochiki Steel Ball&Bearing Co., Ltd.) were charged into a 250-mL widemouthed polyethylene bottle. The resulting mixture was dispersed for 30 minutes with Paint Shaker (produced by Toyo Seiki Seisaku-sho, Ltd.). Subsequently, 35 g of a polyurethane resin SAN-PRENE IB-501, 9.75 g of ethyl acetate, and 5.25 g of isopropyl alcohol were further added to the widemouthed bottle. Then, dispersion was performed with Paint Shaker (produced by Toyo Seiki Seisaku-sho, Ltd.) for 5 minutes. Hereby, polyurethane inks were prepared.

(Measurement of Viscosities of Polyurethane Inks)

Each of the polyurethane inks was left to stand for 1 hour or more in a thermostat kept at 20° C. Subsequently, the viscosity of the ink at a rotation speed of 6 rpm was measured with a Model R85 viscometer RB85L (produced by Toki Sangyo Co., Ltd.). The lower the viscosity, the more excellent the ink.

(Measurement of Transparency)

Each of the polyurethane inks was applied to a PET film Lumirror 50T-60 (produced by Panac Industries, Inc.) with a No. 6 bar coater. The colored film was placed on a black paper sheet with the colored surface facing downward. The transparency of the film was determined visually. Transparency was evaluated on a 9-point scale of 1 to 9. The larger the value, the higher the transparency. The smaller the value, the higher the opacity. The higher the transparency, the more excellent the ink.

Table 1 lists the viscosity of each of the polyurethane inks and the transparency of the corresponding colored film.

TABLE 1

| | Azo pigment in polyurethane ink | Viscosity (mPa · sec) | Transparency |
|---|---|---|---|
| Comparative Example 1 | Comparative PR 57: 1-1' | 400 | 5 |
| Example 1 | PR 57: 1-1 | 180 | 7 |
| Example 2 | PR 57: 1-2 | 300 | 6 |
| Comparative Example 2 | Comparative PR 146-1' | 7260 | 5 |
| Example 3 | PR 146-1 | 4700 | 6 |
| Example 4 | PR 146-2 | 120 | 7 |
| Comparative Example 3 | Comparative PY 13-1' | 22400 | 5 |
| Example 5 | PY 13-1 | 5860 | 7 |
| Comparative Example 4 | Comparative PY 83-1' | 21000 | 5 |
| Comparative Example 5 | Comparative PY 83-2' | 19800 | 5 |
| Example 6 | PY 83-1 | 4860 | 6 |
| Comparative Example 6 | Comparative PO 13-1' | 3540 | 5 |
| Example 7 | PO 13-1 | 110 | 7 |
| Comparative Example 7 | Comparative PY 55-1' | 5900 | 5 |
| Example 8 | PY 55-1 | 2540 | 7 |
| Comparative Example 8 | Comparative PY 180-1' | 31100 | 5 |
| Comparative Example 9 | Comparative PY 180-2' | 32500 | 5 |
| Example 9 | PY 180-1 | 4860 | 7 |
| Comparative Example 10 | Comparative PR 213-1' | 58900 | 5 |
| Example 10 | PR 213-1 | 150 | 7 |
| Comparative Example 11 | Comparative PO 64-1' | 1680 | 5 |
| Example 11 | PO 64-1 | 190 | 6 |

As described in Table 1 above, the azo pigments according to the present invention which were prepared in Examples 1 to 11 had excellent transparency, a low viscosity, and excellent dispersibility compared with azo pigments having similar structures which are known in the related art. Thus, the azo pigment according to the present invention is suitable as an ink (in particular, printing ink).

The invention claimed is:

1. An azo pigment comprising a metal element, wherein the metal element is an iron element, a ratio (Fe/C) of a concentration Fe (atomic %) of the iron element in surfaces of particles of the azo pigment to a concentration C (atomic %) of a carbon element in the surfaces of the particles of the azo pigment, the concentrations Fe and C being determined by X-ray photoelectron spectroscopy, is 0.20 or less, and the azo pigment has a zeta potential of −80 to −30 mV in isopropanol (IPA).

2. The azo pigment according to claim 1, wherein a content of the metal element is 0.05 to 2.00 parts by mass relative to 100 parts by mass of the azo pigment.

3. An ink comprising the azo pigment according to claim 1.

4. A composition comprising the azo pigment according to claim 1, wherein the composition is selected the group consisting of a paint, a colorant for plastics, a colored molded article, a colorant for stationery and writing materials, a printing agent, a toner, a dispersion and a resist for color filters, and a cosmetic material.

5. The azo pigment according to claim 1, wherein the ratio (Fe/C) is 0.0001 or more and 0.20 or less.

6. The azo pigment according to claim 1, wherein the azo pigment is selected from the group consisting of C.I. Pigment Red 57:1, C.I. Pigment Red 146, C.I. Pigment Yellow 13, C.I. Pigment Yellow 83, C.I. Pigment Orange 13, C.I. Pigment Yellow 55, C.I. Pigment Yellow 180, C.I. Pigment Red 123, and C.I. Pigment Orange 64.

* * * * *